(12) United States Patent
Bomar et al.

(10) Patent No.: US 6,535,738 B1
(45) Date of Patent: Mar. 18, 2003

(54) METHOD FOR OPTIMIZING A NUMBER OF COMMUNICATION LINKS

(75) Inventors: John Flavious Bomar, Randolph, NJ (US); Kalyani Gopal, Irvine, CA (US); Ramabadran S Raghavan, Flanders, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 298 days.

(21) Appl. No.: 09/631,887

(22) Filed: Aug. 4, 2000

(51) Int. Cl.$^7$ .................................................. H04Q 7/20
(52) U.S. Cl. ........................ 455/436; 455/442; 455/515; 370/331
(58) Field of Search ................................. 455/437, 442, 455/436, 515; 370/331, 332

(56) References Cited

U.S. PATENT DOCUMENTS

| | | | | |
|---|---|---|---|---|
| 4,783,780 A | | 11/1988 | Alexis ........................... | 370/95 |
| 5,497,505 A | * | 3/1996 | Koohgoli et al. ............. | 455/452 |
| 5,862,487 A | * | 1/1999 | Fujii et al. .................... | 455/437 |
| 6,018,661 A | * | 1/2000 | Raith et al. ................... | 455/515 |
| 6,044,270 A | * | 3/2000 | Raith ............................. | 455/515 |
| 6,321,089 B1 | * | 11/2001 | Han ............................... | 455/442 |
| 6,351,642 B1 | * | 2/2002 | Corbett et al. ................ | 455/436 |
| 6,442,389 B1 | * | 8/2002 | Marcum ........................ | 455/442 |

FOREIGN PATENT DOCUMENTS

| | | | | |
|---|---|---|---|---|
| WO | WO96/08119 | 3/1996 | ............ | H04Q/7/38 |
| WO | WO97/08911 | 3/1997 | ............ | H04Q/7/38 |

* cited by examiner

*Primary Examiner*—Thanh Cong Le
*Assistant Examiner*—Lana Le
(74) *Attorney, Agent, or Firm*—Jimmy Goo

(57) ABSTRACT

Disclosed is a method for improving system capacity without compromising soft handoff by optimizing the number of communication links used in soft handoff. The number of communication links used in soft handoff are optimized by minimizing the number of base stations in the active sets based on signal characteristics of associated communication links. By minimizing the number of base stations in the active sets, the number of traffic channels reserved for soft handoffs may be reduced since less traffic channels would be needed for soft handoffs, thereby increasing system capacity by increasing the number of available traffic channels for assignment to mobile-telephones in non-soft handoff situations.

20 Claims, 1 Drawing Sheet

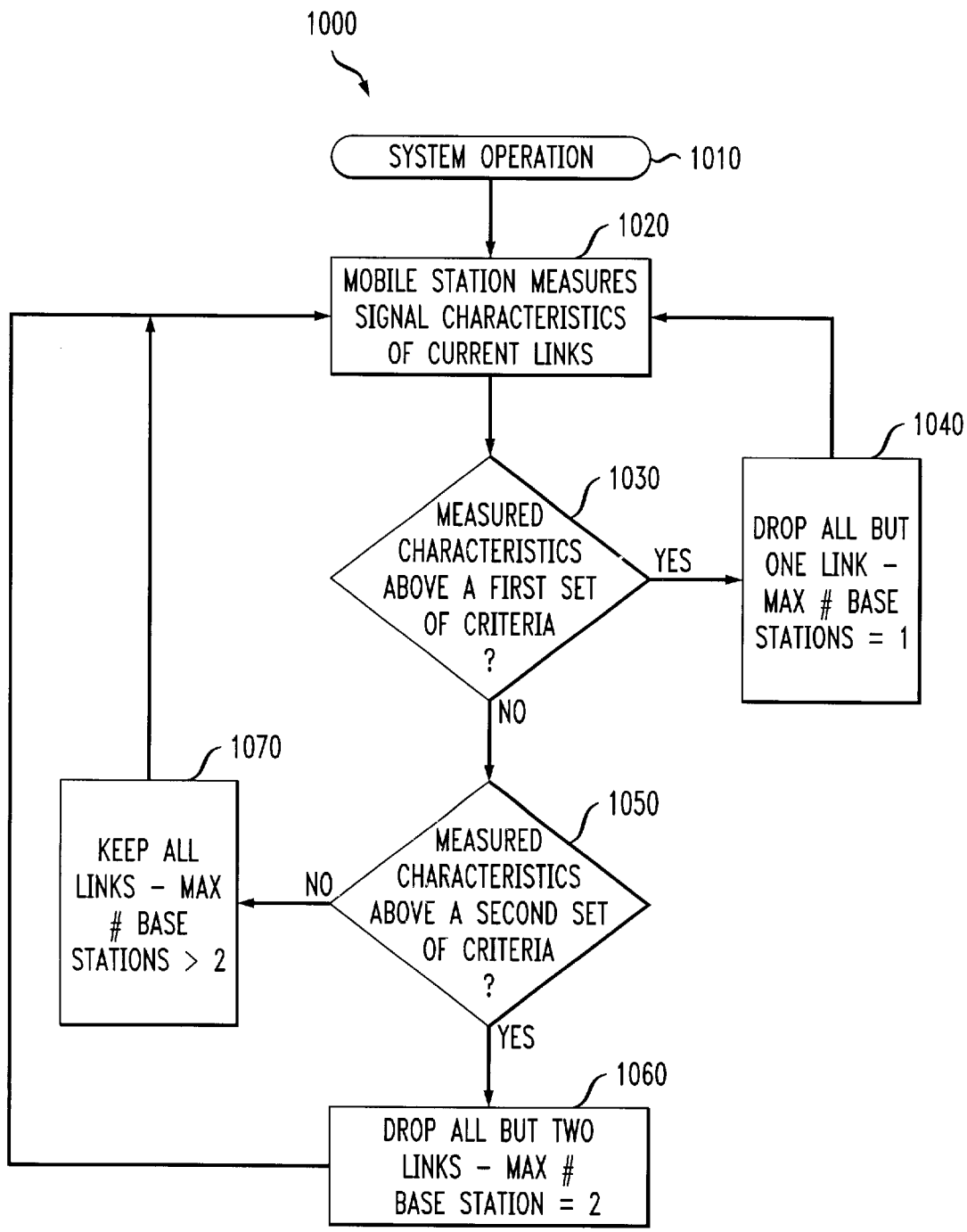

METHOD FOR OPTIMIZING A NUMBER OF COMMUNICATION LINKS

BACKGROUND OF THE RELATED ART

Soft handoffs are one of the greatest advantages of Code Division Multiple Access (CDMA) technology over other multiple access technologies being used for wireless communication systems because of the smooth and seamless transition provided to mobile-telephones traversing from one cell to another cell. Generally, handoffs involve handling calls by a progression of base stations to keep the calls active as the mobile-telephones traverse from one cell to another cell. One type of handoff, referred to herein as soft handoff, is a state in which a mobile-telephone maintains simultaneous communication links with multiple base stations.

In wireless communication systems based on the well-known IS-95 standard for CDMA, a soft handoff occurs in the following manner. A mobile-telephone initiates a call via a primary base station, which is the base station in communication with and in control of call processing for the mobile-telephone. The primary base station is a part of a set of base stations referred to as an "active set," which are base stations with which the mobile-telephone is in communication. The active set includes the primary base station and, perhaps, one or more secondary base stations, wherein the secondary base stations are base stations in communication with but not in control of call processing for the mobile-telephone. When the call is first initiated, the active set includes only the primary base station.

After the call has been established, the mobile-telephone continuously measures signal quality of pilot signals transmitted from base stations which are likely candidates for a handoff. Such base stations are referred to herein as neighbor base stations, which are a part of a set of base stations referred to as a "neighbor set." Soft handoff is initiated when a pilot signal transmitted from a neighbor base station is detected with a signal quality exceeding a threshold T_ADD. Such neighbor base station with a pilot signal quality exceeding T_ADD becomes a candidate for the active set, and is referred to herein as a candidate base station (which is a part of a "candidate set" of base stations), wherein the threshold T_ADD indicates that traffic channels associated with the base station with a pilot signal quality above the threshold T_ADD could be successfully demodulated by the mobile-telephone. When a candidate base station is detected, the mobile-telephone transmits a pilot signal quality measurement message to the primary base station to indicate the measured pilot signal quality.

The candidate base station becomes a secondary base station and, thus, part of the active set, when the mobile-telephone processes a Handoff Direction Message transmitted from the primary base station listing the candidate base station. Once in the active set, the mobile-telephone may be in the soft handoff state and in communication with the secondary base station, i.e., former candidate base station. That is, in soft handoff, the active set base stations transmit the same information signal to the mobile-station and receive the same information signal from the mobile-station (although the information signal may be modulated with a different Walsh code).

The problem with soft handoff is that a pool of traffic channels need to be reserved at each base station for possible use in soft handoff. For example, an IS-95 based CDMA base station has a total of sixty-four communication channels. Of the sixty-four communication channels, fifty-five are traffic channels. Of the fifty-five traffic channels, sixteen traffic channels are reserved for use in soft handoffs. In other words, only thirty-nine traffic channels are available at any IS-95 based CDMA base station for assignment to mobile-telephones in a non-soft handoff situation. Thus, system capacity is degraded twenty-nine percent due to sixteen out of fifty-five traffic channels being reserved for use in soft handoffs. However, if the number of traffic channels reserved for use in soft handoffs is reduced, then the number of calls being dropped as a result of mobile-telephones traversing from one cell to another cell may increase due to traffic channels not being available for soft handoffs. Accordingly, there exists a need to improve system capacity without compromising soft handoff.

SUMMARY OF THE INVENTION

The present invention is a method for improving system capacity without compromising soft handoff by optimizing the number of communication links used in soft handoff. The number of communication links used in soft handoff are optimized by minimizing the number of base stations in the active sets based on signal characteristics of associated communication links, such as signal quality, signal strength and radio frequency (RF) performance. By minimizing the number of base stations in the active sets, the number of traffic channels reserved for soft handoffs may be reduced since less traffic channels would be needed for soft handoffs, thereby increasing system capacity by increasing the number of available traffic channels for assignment to mobile-telephones in non-soft handoff situations.

BRIEF DESCRIPTION OF THE DRAWINGS

The features, aspects, and advantages of the present invention will become better understood with regard to the following description, appended claims, and accompanying drawings where:

FIG. 1 is a flowchart illustrating principles of an embodiment of the present invention.

DETAILED DESCRIPTION

The present invention is a method for improving system capacity without compromising soft handoff by optimizing the number of communication links used in soft handoff, or the number of base stations in active sets to which mobile-telephones may be in communication with while in a soft handoff state. The number of communication links are optimized by minimizing the number of base stations in the active sets based on signal characteristics, such as signal quality, signal strength and radio frequency (RF) performance. By minimizing the number of base stations in the active sets, the number of traffic channels reserved for soft handoffs may be reduced since less would be needed for soft handoffs, thereby increasing system capacity through the increased number of available traffic channels for assignment to mobile-telephones in non-soft handoff situations.

In one embodiment of the present invention, a set of criteria or a plurality of threshold values are utilized for purposes of determining a maximum number of base stations for an active set. FIG. 1 is a flowchart 100 illustrating principles of this embodiment of the present invention. In step 1010, a mobile-station is in a system operation state. When the mobile-station is in the system operation state, the mobile-station has an active call, the mobile-station may or may not be in a soft handoff state, and the active set includes a primary base station and zero or more secondary base stations. For purposes of this application, the mobile-station is in communication with all the base stations in the active set although the mobile-station may not be transmitting signals to all the base stations in the active set or demodulating signals transmitted to the mobile-station from all the base stations in the active set.

In step 1020, the mobile-station measures signal characteristics, such as signal quality, signal strength and radio frequency (RF) performance, of current communication links, i.e., communication links with the base stations in the active set. Typically, the signals being measured for signal characteristics are pilot signals, although other signals may also be measured. For ease of illustration, the present invention will be described herein using signal strength and RF performances as signal characteristics being measured.

In step 1030, it is determined whether any communication links or signals transmitted from one or more base stations in the active set have signal strengths and/or RF performances measured at the mobile-station above a first set of criteria or threshold values, wherein the first set of threshold values includes a first threshold value for signal strength, a first threshold value for RF performance and/or a first threshold value for some hybrid or weighted measurement of signal strength and RF performance. For ease of discussion, a base station in the active set having a signal strength and/or RF performance measurement above the associated threshold values in the first set of criteria or threshold values is hereinafter referred to as "a first threshold base station", whereas a base station in the active set not having a signal strength and/or RF performance measurement above the associated threshold values in the first set of threshold values is hereinafter referred to as "a non-first threshold base station." Preferably, the threshold values in the first set correspond to a signal strength, an RF performance and/or some hybrid thereof which would result in a received signal achieving a first level of signal quality at the mobile-station as measured in terms of frame error rate (FER), bit error rate (BER), signal error rate (SER), signal to noise/interference ratio, etc.

If there is at least one first threshold base station, then the maximum number of base stations that can be in the active set is set to one, in step 1040. That is, the active set is reduced to one base station. For example, suppose there are three base stations in the active set and only signal strength measurements are used to optimize the active sets. If there is only one first threshold base station (or only one signal transmitted from a base station in the active set has a signal strength measurement at the mobile-station over a first signal strength threshold value), then the non-first threshold base stations, i.e., other two base stations in the active set, are dropped from the active set and only the first threshold base station remains in the active set. If there are more than one first threshold base station, then one first threshold base station is selected to remain in the active set and the other first threshold base stations and any non-first threshold base stations are dropped from the active set.

The manner in which a first threshold base station is selected from a plurality of first threshold base stations to remain in the active set may depend on a variety of factors. For example, the selected first threshold base station may have a desired first signal quality, such as highest signal strength measurement or lowest error rate, the selected first threshold base station is the first threshold base station to which the mobile-station is moving or associated with the cell in which the mobile-station is located, etc.

If there are no first threshold base stations, then it is determined whether any signals transmitted from one or more base stations in the active set have signal strengths and/or RF performance measured at the mobile-station above a second set of criteria or threshold values, in step 1050, wherein the second set of criteria or threshold values includes a second threshold value for signal strength, a second threshold value for RF performance and/or a second threshold value for some hybrid or weighted measurement of signal strength and RF performance. For ease of discussion, a base station in the active set having a signal strength and/or RF performance above the associated threshold values in the second set of threshold values (but not above the associated threshold values in the first set of threshold values) is hereinafter referred to as "a second threshold base station", whereas a base station in the active set not having a signal quality measurement above the associated threshold values in the second set of threshold values (but not above the associated threshold values in the first set of threshold values) is hereinafter referred to as "a non-second threshold base station." Preferably, the threshold values in the second set correspond to a signal quality which would result in a received signal achieving a second level of quality at the mobile-station as measured in terms of FER, BER, SER, signal to noise/interference ratio etc., or a combination of received signals achieving the first or second level of quality at the mobile-station as measured in terms of FER, BER, SER, etc. Typically, the threshold values in the first set of threshold values would be higher than the threshold values in the second set of threshold values.

If there is at least one second threshold base station, then the maximum number of base stations that can be in the active set is set to two, in step 1060. That is, two base stations will now be in the active set. If there were more than two base stations in the active set prior to step 1050, then all but two of the base stations are dropped from the active set. If there were only two base stations in the active set prior to step 1050, then the active set does not change. If there was only one base station in the active step prior to step 1050, then a candidate base station is added to the active set.

For example, suppose there are three base stations in the active set. If only two of the base stations in the active set are second threshold base stations, then the non-second threshold base station is dropped from the active set and only the two second threshold base stations remain in the active set. If only one of the base stations in the active set is a second threshold base station, then one of the non-second threshold base stations is dropped from the active set leaving the other non-second threshold base station and the second threshold base station in the active set. If all three are second threshold base stations, then two second threshold base stations are selected to remain in the active set and the other second threshold base station is dropped from the active set. The manner in which a non-second threshold base station is selected to remain in the active set (when there is only one second threshold base station) or a second threshold base station is selected to remain in the active set (when there are more than two second threshold base stations) is similar to the aforementioned manner in which a first threshold base station is selected from a plurality of first threshold base stations to remain in the active set.

In another example, suppose there is only one base station in the active set and such base station is a second threshold base station. In such a situation, a second base station is added to the active set from a candidate set, i.e., candidate base station is added to active set, if any. If there are more than one base station in the candidate set, then the manner in which a candidate is selected to be added to the active set (when there is only a second threshold base station in the active set) is similar to the aforementioned manner in which a first threshold base station is selected from a plurality of first threshold base stations to remain in the active set.

If there are no second threshold base stations, then the maximum number of base stations that can be in the active set is set to some number greater than two, in step 1070. That is, the active set is expanded to include three or more base stations. If there are not at least three base stations currently in the active set, then candidate base stations, if any, may be added to the active set until the active set has reached its maximum capacity, i.e., maximum number of base stations. If less than all the candidate base stations can be added to the active set, the manner in which a candidate base station is selected to be added to the active set (when the active set is not at its maximum capacity) is similar to the aforementioned manner in which a first threshold base station is selected from a plurality of first threshold base stations to remain in the active set.

The present invention may be implemented at some network entity, such as a base station or mobile switching center (MSC), or at the mobile-station. In one embodiment, the active set is optimized by the primary base station. Specifically, the primary base station, MSC or other network entity receives signal quality measurements from the mobile-station (corresponding to signals transmitted by the primary base station and other base stations which were received by the mobile-station) and determines which base stations should be in the active set based on the received measurements. Upon making a determination in accordance with the above described technique, the primary base station (or a secondary base station) transmits an message indicating to the mobile-station which base stations should be included in the active set.

In another embodiment, the mobile-station selects base stations from the active set to which the mobile-station will be in communication. Specifically, the primary base station transmits a message to the mobile-station indicating the base stations in the active set. Based on signal quality measurements at the mobile-station of signals transmitted by the base stations in the active set (and/or candidate base stations), the mobile-station makes a determination in accordance with the above described technique as to what base stations in the active set the mobile-station will be in communication. In this embodiment, the active set will be determined in accordance with the prior art, and the mobile-station will not change what base stations are to be in the active set. What will be different is that the mobile-station will not necessarily be in communication with every base station in the active set, as in the prior art, if certain thresholds are met.

Although the present invention has been described in considerable detail with reference to certain embodiments, other versions are possible. For example, there may be more than two set of threshold values for determining how many base stations to be in the active set. Or two second threshold base stations may be required in order to proceed from step 1050 to step 1060. Therefore, the spirit and scope of the present invention should not be limited to the description of the embodiments contained herein.

We claim:

1. A method of optimizing a number of communication links used by a mobile-station comprising the steps of:

measuring characteristics for a plurality of communication links associated with a plurality of base stations in communication with the mobile-station, wherein each of the plurality of communication links is a traffic channel; and dropping all but one of the plurality of communication links if the measured characteristics of at least one of the plurality of communication link satisfy a first set of criteria, wherein the one of the plurality of communication links not dropped has measured characteristics which satisfy the first set of criteria.

2. The method of claim 1, wherein the one of the plurality of communication links not dropped is selected based on a relative signal quality compared to the plurality of communication links which were dropped.

3. The method of claim 1, wherein the one of the plurality of communication links not dropped is selected based on a relative position compared to the plurality of communication links which were dropped.

4. The method of claim 1, wherein the one of the plurality of communication links not dropped is selected based on a relative motion compared to the plurality of communication links which were dropped.

5. The method of claim 1 comprising the additional step of:

dropping all but two of the plurality of communication links if the measure characteristics of at least one of the plurality of communication links satisfy a second set of criteria but not the first set of criteria.

6. The method of claim 5, wherein a new communication link is established if the plurality of communication links does not include at least two communication links.

7. The method of claim 6, wherein the new communication link is associated with a candidate base station.

8. The method of claim 1 comprising the additional step of:

not dropping any of the plurality of communication links if the measure characteristics of at least one of the plurality of communication links do not satisfy the first set of criteria nor a second set of criteria.

9. The method of claim 8, wherein new communication links are established if the plurality of communication links does not at least three communication links.

10. The method of claim 9, wherein the new communication links are associated with candidate base stations.

11. The method of claim 1, wherein the characteristics being measured include signal quality.

12. A method of optimizing a number of communication links used by a mobile-station comprising the steps of:

measuring characteristics for a plurality of communication links associated with a plurality of base stations in communication with the mobile-station, wherein each of the plurality of communication links is a traffic channel; and dropping all but two of the plurality of communication links if the measure characteristics of at least one of the plurality of communication links satisfy a second set of criteria but not a first set of criteria.

13. The method of claim 12, wherein the two of the plurality of communication links not dropped is selected based on a relative signal quality compared to the plurality of communication links which were dropped.

14. The method of claim 12, wherein the two of the plurality of communication links not dropped is selected based on a relative position compared to the plurality of communication links which were dropped.

15. The method of claim 12, wherein the two of the plurality of communication links not dropped is selected based on a relative motion compared to the plurality of communication links which were dropped.

16. The method of claim 12, wherein a new communication link is established if the plurality of communication links does not include at least two communication links.

17. The method of claim 12, wherein the new communication link is associated with a candidate base station.

18. The method of claim 12 comprising the additional step of:

not dropping any of the plurality of communication links if the measure characteristics of at least one of the plurality of communication links do not satisfy the first set of criteria nor a second set of criteria.

19. The method of claim 18, wherein new communication links are established if the plurality of communication links does not at least three communication links.

20. The method of claim 19, wherein the new communication links are associated with candidate base stations.

* * * * *